United States Patent [19]

Lysen

[11] Patent Number: 4,725,738
[45] Date of Patent: Feb. 16, 1988

[54] DEVICE FOR DETECTING CHANGES IN THE RELATIVE POSITION OF SEPARATELY MOUNTED MACHINES

[76] Inventor: Heinrich Lysen, Kirchenstrasse 95, D-8000 Mühen 80, Fed. Rep. of Germany

[21] Appl. No.: 827,978

[22] PCT Filed: May 22, 1985

[86] PCT No.: PCT/EP85/00243
§ 371 Date: Jan. 22, 1986
§ 102(e) Date: Jan. 22, 1986

[87] PCT Pub. No.: WO85/05443
PCT Pub. Date: Dec. 5, 1985

[30] Foreign Application Priority Data

May 22, 1984 [DE] Fed. Rep. of Germany ....... 3419059

[51] Int. Cl.⁴ .................................................. G01N 21/86
[52] U.S. Cl. .................................... 250/561; 356/400; 250/201
[58] Field of Search ............... 250/560, 561, 201, 216; 356/399, 400, 141, 152

[56] References Cited

U.S. PATENT DOCUMENTS

| | | | |
|---|---|---|---|
| 2,703,505 | 3/1955 | Senn | 356/400 |
| 3,923,402 | 12/1975 | Turcotte | 356/141 |
| 4,097,157 | 6/1978 | Lill | 356/152 |
| 4,518,855 | 5/1985 | Malak | 250/201 R |

*Primary Examiner*—David C. Nelms
*Attorney, Agent, or Firm*—Robert W. Fiddler

[57] ABSTRACT

An apparatus is proposed for detecting changes in the mutual position of two mutually spaced and separately mounted machines or parts thereof in relation to a given initial position in a rectangular spatial coordinate system. A high degree of functional capability and accuracy of measuring which at the same time ensuring a simple structure and high reliability is made possible. Furthermore, errors in alignment in the form of parallel and angular offset may be immediately seen. This is made possible by the use of a respective reflecting rectangular prism and a respective light transmitter for each of the three axial directions of the coordinate system, in which a mutual parallel offset and angular offset is to be detected. The reflecting and the light transmitters are mutually rigidly fitted on the machines or parts thereof.

6 Claims, 8 Drawing Figures

DEVICE FOR DETECTING CHANGES IN THE RELATIVE POSITION OF SEPARATELY MOUNTED MACHINES

The invention relates to an apparatus for detecting changes in the relative position of separately mounted machines. A relative change in the positions of machines mounted with a space between them may frequently lead to critical operational situations. This is for example the case with rotating machinery, whose shafts are coupled together. Such machines are aligned in relation to each other before being put into operation and every change in the relative alignment taking place during use may lead to serious damage to the bearings and possibly other parts of the machines. So far such machines have been inspected in different ways, as for example by constantly sensing the alignment of the shafts by using measuring fittings mounted on the shafts, by continuous measurement of the bearing temperature and by continuous measurement of vibrations of the machines.

The object of the invention is to inspect machines which have a critical position in relation to each other by continuously ascertaining their postions as related to their initial position. More specifically, the aim of the invention is to devise an apparatus for this purpose which is characerized by accuracy of measurement while being simple in design and capable of indicating both parallel and angular misalignments.

The invention takes advantage of the particular optical properties of reflecting prisms or similar optical systems.

The invention takes advantage of the property of a reflecting prism or similar optical system by which a ray reflected from a prism on the incidence of a highly collimated light ray approximately perpendicular to the hypotenuse plane of the prism changes in direction if the prism is revolved about an axis through the apex and parallel to the hypotenuse plane and that this change in direction leads to a displacement of the point of incidence of the reflected light ray on a plane approximately perpendicular to the said ray in a direction which is perpendicular to the direction in which the point of incidence moves in the case of a displacement of the prism or the like parallel to the apical line. The orientation of the prisms in accordance with the invention ensures that at the light transmitter the parallel offset component and the angular offset component of any change in position of the machines in relation to each other in a direction towards or around, one of the axes of the spatial coordinate system may be clearly distinguished as separate components as well, since they may be read off along rectangular coordinates of the displacement of the point of incidence of the light ray from a given reference point.

In cases in which relative alignment of the machines to be inspected is only critical in two coordinate directions, the inspection of the third coordinate direction may be considered unnecessary. In this case the invention offers the advantage of corresponding reduction of structural complexity by having one less prism or the like with its respective light transmitter and light receiver.

The invention will now be described in more detail having reference to the drawings and on the basis of one embodiment.

FIGS. 1 and 2 show a rectangular reflecting prism 1 in different positions.

If an incoming and preferably highly collimated light ray L strikes the prism 1 perpendicularly to the hypotenuse plane H, it will be twice reflected at the adjacent faces K and will then leave the prism as a light ray L' perpendicularly to the hypotenuse plane H of the prism at a given distance from the incident light ray L. If the said prism 1 is revolved about an axis parallel to the apical line S, as seen in FIGS. 1 and 2 extending through the prism apex parallel to the hypotenuse plane H; this will have no effect on the direction of the reflected light ray L' and its distance from the incident light ray L will not change at all.

Figure 1:
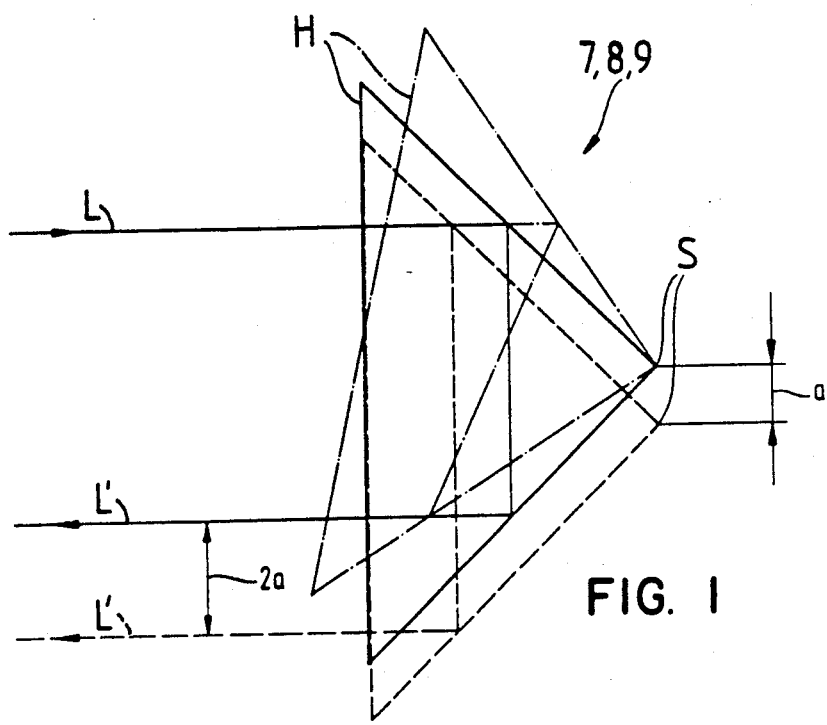
FIGS. 1 and 2 show a reflecting prism diagrammatically from the side and from above, respectively.
Figure 2:
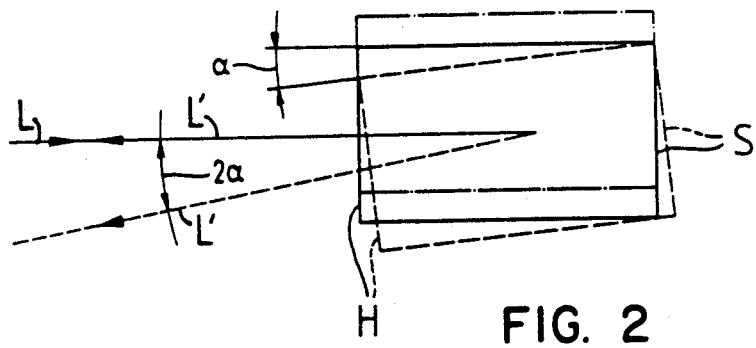

On the other hand, when prism 1 is rotated about an axis such as through b shown in FIG. 2; that is perpendicular to the apical line S and parallel to the hypotenuse plane H there will be a change in the angle of reflection perpendicularly in relation to the plane of FIG. 1, the amount of such in angle being twice the amount of revolution of the prism. This means that motion of the point of incidence of the light ray L' on a plane approximately parallel to the plane of the FIG. 1 may only be the result of a displacement of the prism 1 parallel to the plane of FIG. 1 and displacement of this line of reflection perpendicular thereto may only be the result of revolving the prism about an axis (see FIG. 2) perpendicular to the apical line S.

Figure 3:
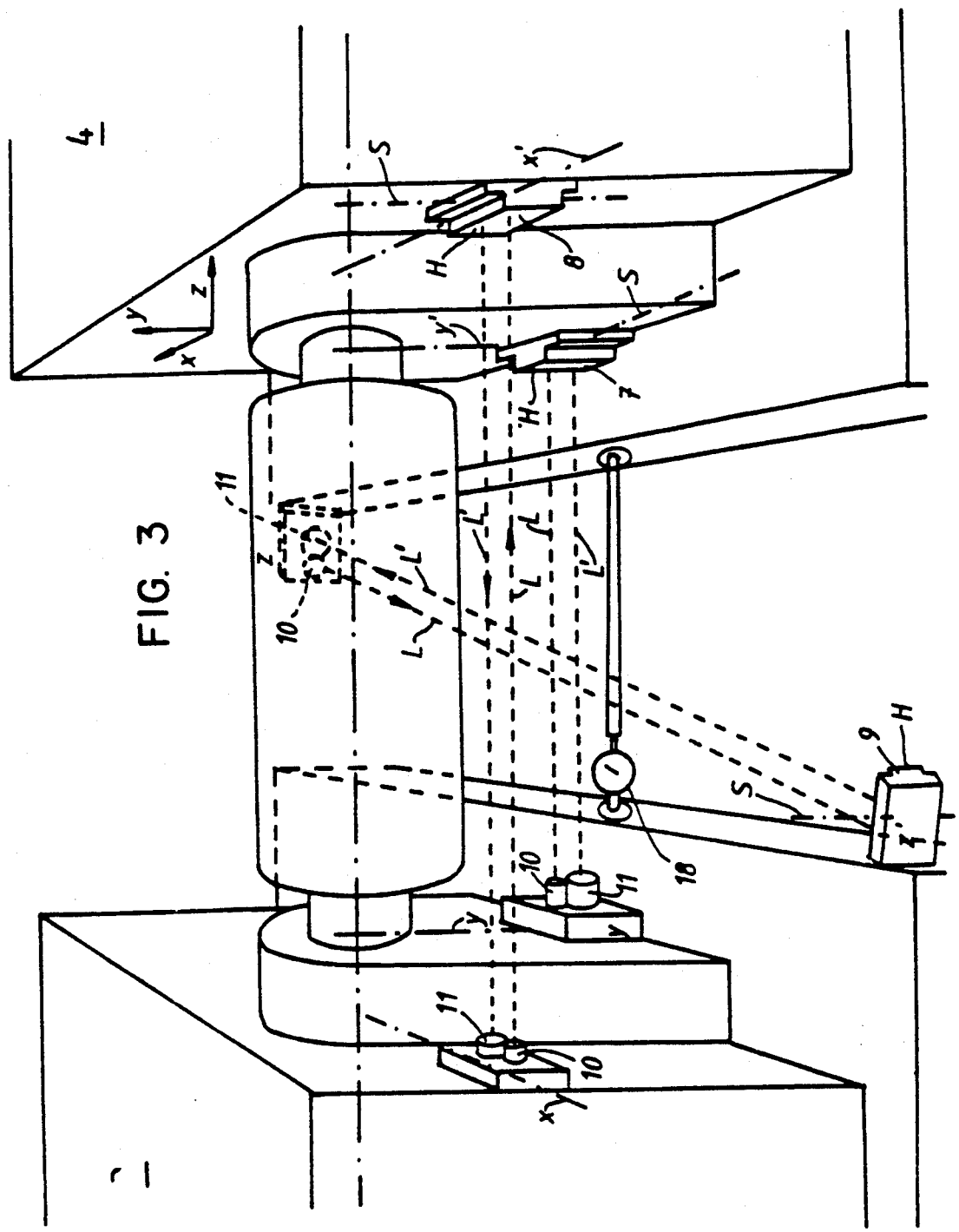
FIG. 3 show two rotary machines equipped with the apparatus of the invention with coupled shafts, as seen in a perspective view.

The properties described above in connection with FIGS. 1 and 2 above of rectangular reflecting prisms or similar optical systems are employed in the machine set-up in accordance with FIG. 3 as part of an apparatus for continuously inspecting or monitoring the relative positions of the machines. FIG. 3 shows two separately placed rotary machines 3 and 4, of which one is for example a motor and the other a generator, their shafts 5 and 6 being coupled together. Before putting the machines 3 and 4 into service they are so aligned in relation to each other that the shafts 5 and 6 are precisely in line and in the time thereafter great importance is attached to keeping this alignment and making certain that any alignment errors occurring during operation are detected in good time even while quite small so that they may be corrected and serious damage to the machines avoided.

For continuously inspecting the relative position of the machines 3 and 4 in the space defined by the coordinate directions X, Y and Z three prisms 7, 8 and 9 are so mounted on the two machines 3 and 4 that each such prism is related to a respective one of the three coordinate systems X, Y, and Z to detect mutual turning of the machines 3 and 4 about this axial direction or, respectively, mutual parallel displacement of the machines in this axial direction, that is to say with respect to parallel offset and angular offset in relation to the respective axial direction. For this purpose the prism 8, which is aligned with the x-direction of the coordinate system, is so mounted on the machine 4 that its apex S is generally perpendicular on the coordinate plane x-z containing the associated axial direction x and its hypotenuse surface H is approximately parallel to the other coordinate plane x-y containing this axial direction x. The arrangement might also be such that the apex S of the prism 8 would be perpendicular on the x-y plane while its hypotenuse plane H would be parallel to the x-z plane, providing this is compatible with the arrangement of a respective light transmitter and an associated light receiver are explained below.

In a similar manner and with the same possibility of exchange as regards the orientation of the apical line S and of the hypotenuse plane H the rectangular reflecting prism 7 for the y coordinate direction is mounted on the machine 4 with such an alignment that its apical line S is perpendicular to the y-z plane and its hypotenuse plane H is parallel to the x-y plane.

The prism 9 is mounted on the machine 3 in a different way to the prisms 7 and 8, that is to say with such an orientation that its apical line S is perpendicular to the x-z plane and its hypotenuse plane H is generally parallel to the y-z plane. The wording "generally parallel" is used herein in the sense that the positions of the individual prisms would include positions which would be distinctly different to the exactly 90° positions, since "spurious settings", which are nevertheless near the precise 90° setting but are not exactly the same as it, would nevertheless make possible the desired separation into an angular offset component and a parallel offset component perpendicular thereto fully sufficient for practical needs, if the respective prism or the machine on which its is mounted, be turned around the respective coordinate direction or moved in such direction parallel to itself. When high accuracy is involved, an alignment of the prism to be exactly set in the 90° position with respect to the apical line and exactly in the parallel setting with respect to the hypotenuse plane is to be recommended in each case with respect to the associated coordinate plane, this adjustment having to be carried out in the aligned initial position of the machines 3 and 4.

A light transmitter is mounted on the respective other machine 3 and 4, respectively for each prism 7, 8 and 9 and such transmitter produces a highly collimated light ray L generally perpendicular to the hypotenuse plane H of the respective prism. Furthermore for each prism 7, 8 and 9 a light receiver 11 is rigidly attached to the respective other machine and such receiver receives the light ray L' reflected by the associated prism and supplied a signal corresponding to the deviation of the light ray incidence point from a fixed reference point in accordance with the magnitude and direction thereof.

Preferred embodiments of the light transmitter and of the light receiver will be described further below.

If for example the machine 4 is turned in relation to the machine 3 about an axis parallel to the coordinate direction x, the prisms 7 and 8 will take part in such rotary motion. In the case of the prism 8 this rotary motion about the coordinate direction x normal to its apical line S results in a displacement of the point of incidence of the reflected light ray L' on the light receiver 11 in the y direction, whereas it does not have any effect on the light ray L' reflected by the prism 7, because it turns the prism 7 about its apical line S, which as noted above, does not produce any change in the line of reflecton of L'.

If on the other hand the macine 4 is offset parallel to itself in the coordinate direction x for some reason or other during the course of operation, in relation to the machine 3, the distance of the associated incident light ray L from the associated light ray L' will change correspondingly, that is to say in such a manner that the point of incidence of the light ray L' on the associated light receiver 11 will move to a linearly proportional degree exactly in the x direction, i.e. normal to the direction caused by rocking about the x axis, because the light ray L from the transmitter 10 is fixed in space in relation to the machine 3. This parallel offset of the machine 4 in relation to the machine 3 again does not have any effect on the reflection properties of the prism 7, because the prism 7 is displaced in the direction of its apical line S and in this respect there will clearly be no change in the distance between the light rays L and L' associated with it.

The same considerations with respect to the insensitivity of the prism 7 during a parallel offset and an angular offset in respect to the x direction between the machines 3 and 4 also apply for the prism 9 in connection with the light transmitter 10 and the light receiver 11, which are associated with it.

Obeying the same basic principle explained in connection with the prism 8, a parallel offset and an angular offset in relation to the y direction will only have an effect on the optical device consisting of the prism 7, the associated light transmitter 10 and the associated light receiver 11, and a parallel offset and an angular offset with respect to the z axis will only have an effect on the optical device consisting of the prism 9, the light receiver and the light transmitter, which are associated therewith.

Figure 6:
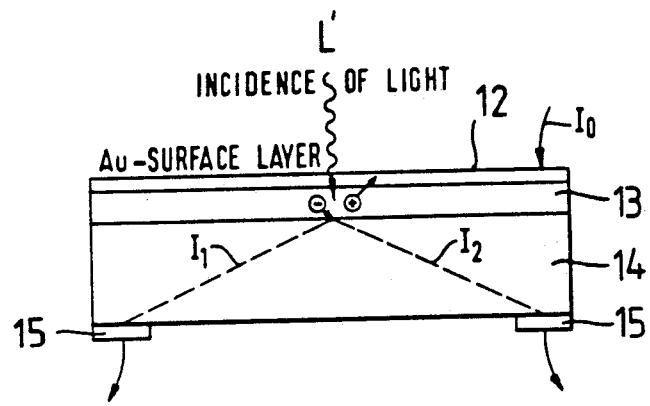
FIG. 6 shows a schematic cross-section of a form of the light receivers on the machine set-up in accordance with FIG. 3 in the form of a photelectric semi-conductor position detector.
Figure 7:
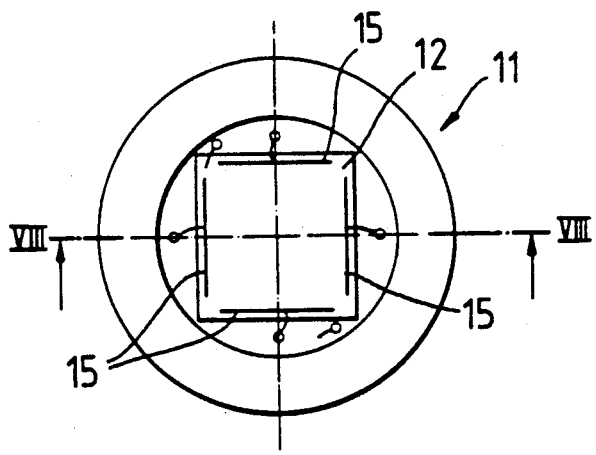
FIG. 7 shows the postion detector as in FIG. 6 in a dual-axis form, from the front.
Figure 8:
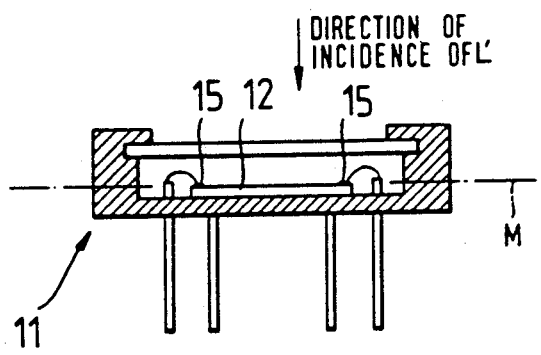
FIG. 8 is a cross section through the detector as in FIG. 7 on the line V—V.

FIGS. 6 through 8 show a preferred embodiment of the light receiver 11 employed in the machine set-up of FIG. 3. The light receiver is in this case a dual-axis, analog, photelectric semiconductor position detector and has a covering layer 12 of gold over a depletion zone 13 which is on a high-ohmic substrate 14, the gold covering layer 12 being supplied with a current $l_o$, and on the high-ohmic substrate to the side and over and under it there are contact strips 15 running along the generally square cross section of the substrate and via the strips the input current $l_o$ is divided up into fractions which are conducted away. The splitting of the current $l_o$ will be in a way dependent on the position of incidence of the reflected light ray L' on the gold covering layer generally at a right angle. In the arrangement in accordance with FIGS. 7 and 8 in the form of a dual axis position detector the input current $l_o$ is split up into four fractions, that are conducted away via the separate contact strips 15 and will have sizes dependent on the distance of the point of light incidence from the center. Therefore if the ray is incident exactly in the middle of the square gold covering layer which is aligned exactly with the depletion zone and the substrate, something that is preferably brought about by suitable adjustment of the arrangement in the initial position of the machines 3 and 4, the four current fractions will be equal to each other in magnitude. It will be possible to see from any difference in the current at the pairs, that are placed opposite to each other, of contact strips 15 what the rectangular components of the distance of an eccentric point of light incidence from the center of the coordinates is and therefore it will be possible to detect any departure occurring during operation of the relative machine position from the initial setting in terms of the angular and parallel offset in relation to the respective coordinate alignment.

Position detectors of the above described type are commercially available.

The light receivers 11 as in FIGS. 6 through 8 are so mounted on the machine that the splitting up of the vector for the displacement of the point of incidence from zero point in rectangular components is in agreement with the respective axial direction of the spatial coordinate system.

Figure 5:
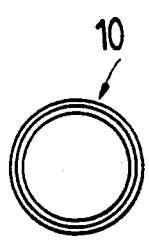
FIGS. 4 and 5 show a preferred embodiment of the light transmitter used for the machines in FIG. 3 diagrammatically in plan and from the front, respectively.
Figure 4:
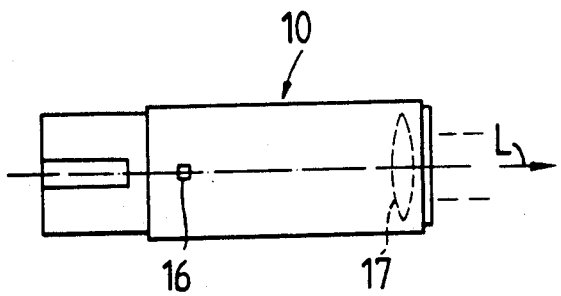

FIGS. 4 and 5 show a preferred embodiment of the light transmitter 10, which in the present case consists of a laser crystal 16 and a collimator lens 17 and produces a light ray L with an extremely small degree of divergence of the order of less that 1 mrad, and which is transmitted to the oppositely placed associated prism 7, 8 or 9. At the other machine the light ray L will be incident on the rectangular prism, that reflects it to the above described light receiver.

The light transmitters 10 in accordance with FIG. 4 and 5 are also commercially available.

Therefore, in operation the optical inspection device provides continuous signals, that are characteristic for the relative position of the machines 3 and 4 in relation to an initial position and which may be used in an electronic device, as for example a digital data processing device, for producing a continuous indication of the alignment condition and a warning signal if there is a degree of misalignment exceeding a certain amount. By the input of machine data with respect to the exact position of the points of mounting on the foundation in relation to each other it is possible for the electronic data processing device to process the signals received by the light receiver and to work out the type and size of corrections to be made at the individual mounts as required to correct a given misalignment. The user is then in a position at any time to undertake correction of misalignment that has occurred by correcting adjustments as indicated by the data processing device.

It is frequently the case, as for instance with separately mounted rotary machines with coupled shafts, that only misalignment is important that is in relation to certain axial directions which define a plane perpendicular to a given axis, in the present case the center axis of the machine shaft. In such an event it is only necessary to have two prisms, that is to say the prisms 7 and 8 in the machine set-up in FIG. 3, with the respective light transmitter 10 and the light transmitter 11. An axial displacement in the z direction, which would be very much less serious for the operation of the rotary machines, may be detected in some other way, as for example using a dial gage 18.

I claim:

1. An apparatus for detecting changes in the position of two mutually spaced and separately mounted machines or parts thereof in relation to a given initial position in a common rectangular, spatial coordinate system using rigidly mounted rectangular reflecting prisms whose apex (S) is perpendicular on one of the two planes of the coordinate system, which contain the axial direction to be monitored, and whose hypotenuse plane (H) is parallel to the other plane containing this axial direction on the one machine and light transmitters and light receivers on the other machine, the light transmitters projecting a light ray generally perpendicular to the hypotenuse plane onto the respective prism and the light receivers receiving the light ray reflected by the associated prism and supplying a signal dependent on the position of incidence thereof in relation to a given reference point, characterized in that for separate detection of the mutual parallel offset and of the mutual angular offset of the machines (3 and 4) or parts thereof there is separately provided a rectangular prism (7, 8 or 9) for at least two axial directions of the coordinate system (x, y and z) and the light transmiters (10) transmit the respective ray (L) in a sharply collimated form and the light receivers (11) each supply a signal, which corresponds to the displacement of the point of incidence of the received reflected light ray (L') from a fixed reference point in the plane of incidence in terms of magnitude and direction.

2. The apparatus as claimed in claim 1 characterized in that that the light transmitter (10) comprises a laser diode.

3. The apparatus as claimed in claim 1 characterized in that the light receiver (11) is a dual-axis analog photoelectric semiconductor position detector.

4. The apparatus as claimed in claim 1 for inspecting rotary machines with aligned coupled shafts in the initial position characterized in that that in the case of shafts (5 and 6) extending in the one axial direction (z) of the coordinate system (x, y and z) prisms (7 and 8) or the like, light transmitters (10) and light receivers (11) on the machines (3 and 4) for the two other axial directions are only used.

5. A method of using the apparatus as claimed in claim 4 characterized in that that the axial direction (z), in which the shafts (5 and 6) of the rotary machines (3 and 4) extend are only inspected for parallel offset (18).

6. The apparatus as claimed in claim 1 characterized by a device connected with the light receiver (11) for producing a continuous indication of the current displacement of the relative machine position from the initial position and for giving a warning signal when the displacement exceeds a given value.

* * * * *